United States Patent
Chen et al.

(10) Patent No.: US 10,244,146 B2
(45) Date of Patent: Mar. 26, 2019

(54) COLOR CORRECTION SYSTEM AND METHOD

(71) Applicant: SZ DJI TECHNOLOGY CO., LTD., Shenzhen (CN)

(72) Inventors: Wei Chen, Shenzhen (CN); Zisheng Cao, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/977,661

(22) Filed: May 11, 2018

(65) Prior Publication Data

US 2018/0262650 A1 Sep. 13, 2018

Related U.S. Application Data

(63) Continuation of application No. 15/646,301, filed on Jul. 11, 2017, now Pat. No. 9,998,632, which is a
(Continued)

(51) Int. Cl.
*G06T 5/00* (2006.01)
*H04N 1/60* (2006.01)
(Continued)

(52) U.S. Cl.
CPC ........... *H04N 1/6027* (2013.01); *G06T 5/002* (2013.01); *G06T 7/90* (2017.01); *G09G 5/02* (2013.01);
(Continued)

(58) Field of Classification Search
CPC ........ H04N 1/6027; H04N 1/60; G06T 5/002; G06T 7/0018; G06T 2207/10024
See application file for complete search history.

(56) References Cited

U.S. PATENT DOCUMENTS 5,471,324 A * 11/1995 Rolleston ............. H04N 1/6033
358/518
9,049,334 B1 * 6/2015 Cutzu ........................ H04N 9/64
(Continued)

FOREIGN PATENT DOCUMENTS

CN 104023218 A 9/2014
CN 1622135 A 1/2015
(Continued)

OTHER PUBLICATIONS

Quan ("Analytical Approach to the Optimal Linear Matrix with Comprehensive Error Metric," SPIE Electronic Imaging Conference, vol. 5292, San Jose, 2004); previously provided. (Year: 2004).*
(Continued)

*Primary Examiner* — Yubin Hung
(74) *Attorney, Agent, or Firm* — Anova Law Group, PLLC

(57) ABSTRACT

A computer-implemented method for color correction includes obtaining a noise evaluation image by adding noise to a noise-free image, color correcting the noise evaluation image using a plurality of color correction parameters, color correcting the noise-free image using the plurality of color correction parameters, determining a noise amplification metric at least by comparing the corrected noise evaluation image with the corrected noise-free image, and adjusting the plurality of color correction parameters based on the noise amplification metric.

20 Claims, 16 Drawing Sheets

Related U.S. Application Data continuation of application No. 15/176,037, filed on Jun. 7, 2016, now Pat. No. 9,742,960, which is a continuation of application No. PCT/CN2015/079094, filed on May 15, 2015.

(51) Int. Cl.
  *G09G 5/02* (2006.01)
  *G09G 5/06* (2006.01)
  *H04N 9/68* (2006.01)
  *H04N 9/73* (2006.01)
  *G06T 7/90* (2017.01)

(52) U.S. Cl.
  CPC ............... *G09G 5/06* (2013.01); *H04N 9/68* (2013.01); *H04N 9/735* (2013.01); *G06T 2207/10024* (2013.01); *G09G 2320/0693* (2013.01); *G09G 2340/0407* (2013.01); *G09G 2340/06* (2013.01); *G09G 2370/12* (2013.01); *G09G 2380/08* (2013.01); *H04N 1/60* (2013.01); *H04N 1/6033* (2013.01)

(56) References Cited

U.S. PATENT DOCUMENTS

| | | | | |
|---|---|---|---|---|
| 9,153,013 | B2* | 10/2015 | Jiyun | G06T 5/002 |
| 2002/0034337 | A1* | 3/2002 | Shekter | G06K 9/40 |
| | | | | 382/275 |
| 2002/0097907 | A1* | 7/2002 | Fukasawa | H04N 1/6058 |
| | | | | 382/167 |
| 2005/0073596 | A1* | 4/2005 | Takahashi | H04N 5/365 |
| | | | | 348/241 |
| 2007/0198203 | A1* | 8/2007 | Kimura | A61B 6/585 |
| | | | | 702/85 |
| 2007/0263098 | A1* | 11/2007 | Quan | H04N 1/6086 |
| | | | | 348/222.1 |
| 2009/0015674 | A1* | 1/2009 | Alley | G01C 11/025 |
| | | | | 348/144 |
| 2013/0016082 | A1 | 1/2013 | Coley et al. | |
| 2014/0043627 | A1 | 2/2014 | Toso et al. | |
| 2015/0073306 | A1* | 3/2015 | Abeyratne | A61B 7/003 |
| | | | | 600/586 |
| 2015/0097990 | A1* | 4/2015 | Manabe | H04N 5/23245 |
| | | | | 348/241 |
| 2015/0245002 | A1* | 8/2015 | Kuramoto | H04N 9/646 |
| | | | | 348/70 |

FOREIGN PATENT DOCUMENTS

| | | |
|---|---|---|
| JP | 2008099069 A | 4/2008 |
| KR | 20100079479 A | 7/2010 |

OTHER PUBLICATIONS

Quan, Shuxue ("Evaluation and optimal design of spectral sensitivities for digital color imaging," Ph.D. Dissertation, College of Science, Rochester Institute of Technology, 2002); previously provided. (Year: 2002).*

The World Intellectual Property Organization (WIPO) International Search Report and Written Opinion for PCT/CN2015/079094 dated Sep. 24, 2015 6 Pages.

Shuxue Quan, Analytical Approach to the Optimal Linear Matrix with Comprehensive Error Metric, SPIE Electronic Imaging Conference, vol. 5292, San Jose, 2004.

Shuxue Quan, Evaluation and optimal design of spectral sensitivities for digital color imaging, Ph.D. Dissertation, College of Science, Rochester Institute of Technology, 2002.

* cited by examiner

400

```
┌─────────────────────────────┐
│ Obtain Input Color Value $C_{in}$, │
│ Reference Color Value $C_{ref}$, and │
│   Noise Evaluation Image    │
│                             │
│            401              │
└─────────────────────────────┘
              │
              ▼
┌─────────────────────────────┐
│ Adjust Color Correction Parameters │
│  to Optimize Fitness Function $J$  │
│                             │
│            402              │
└─────────────────────────────┘
```

*FIG. 4*

COLOR CORRECTION SYSTEM AND METHOD

CROSS-REFERENCE TO RELATED APPLICATIONS

This application is a continuation of application Ser. No. 15/646,301, now U.S. Pat. No. 9,998,632, filed on Jul. 11, 2017, which is a continuation of application Ser. No. 15/176, 037, now U.S. Pat. No. 9,742,960, filed on Jun. 7, 2016, which is a continuation of PCT application No. PCT/CN2015/079094, filed on May 15, 2015, the entire contents of all of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosed embodiments relate generally to digital image processing and more particularly, but not exclusively, to systems and methods for color correction of digital images.

BACKGROUND

Because digital imaging devices acquire colors differently from the way that human eyes perceive color, images acquired by digital imaging devices typically benefit from color correction. However, the color correction process may be prone to introducing and/or amplifying different types of noise. This is the general area that embodiments of the disclosure are intended to address.

BRIEF DESCRIPTION OF THE DRAWINGS

FIG. 4 is exemplary top-level flow chart illustrating an embodiment of a method for calibrating a digital imaging device.

Figure 1:
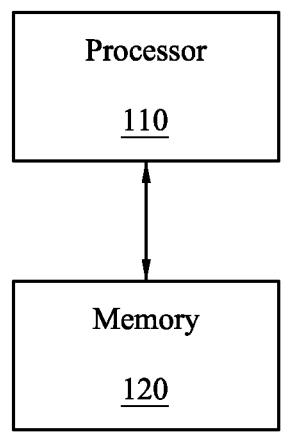
FIG. 1 is an exemplary top-level block diagram illustrating an embodiment of a color correction apparatus for color-correcting a digital image.

It should be noted that the figures are not drawn to scale and that elements of similar structures or functions are generally represented by like reference numerals for illustrative purposes throughout the figures. It also should be noted that the figures are only intended to facilitate the description of the example embodiments. The figures do not illustrate every aspect of the described embodiments and do not limit the scope of the present disclosure.

DETAILED DESCRIPTION OF THE EMBODIMENTS

Example embodiments are illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

Color correction is a process that transforms signals acquired by photosensors of digital imaging devices into colors that look realistic. Color correction is a transformation defined by a set of color correction parameters. These parameters are typically calibrated for each individual digital imaging device to find customized parameter values that accurately reflect the color response characteristics of the individual device.

The calibration of color correction parameters entails an optimization process in which colors values acquired by the imaging device are compared with known reference color values. Typically, the goal during the optimization process is to minimize a difference between the acquired colors post-color-correction and the known reference values. A drawback of this approach, however, is that accounting for color correction accuracy alone can often result in parameters that excessively amplify noise. Image noise can include color and brightness variations in an image. These variations are not features of an original object imaged but, instead, are attributable to artifacts introduced by the acquisition and processing of the image. Sources of noise include, for example, quantum exposure noise, dark current noise, thermal noise, readout noise, and others. Since image noise is inversely proportional to the size of the imaging device, the problem of noise is especially acute for smaller imaging devices. When image acquisition is performed aboard mobile platforms such as unmanned aerial vehicles (UAVs), the image noise problem is especially acute both because of the smaller cameras used on the mobile platforms and because of noise introduced by movement of the mobile platforms. In view of the foregoing, there is a need for improved color correction systems and methods that increase color correction accuracy while limiting noise amplification.

The present disclosure sets forth systems and methods for color correction of a digital image which overcome shortcomings of existing color correction techniques by increasing color correction accuracy while limiting noise amplification. Based on color reference images, color correction parameters are calibrated to increase color correction accuracy while limiting noise amplification. The calibration can be performed in the CIE L*a*b* color space to more closely reflect human perception of distances between colors. The calibration can be performed with reference to a virtual noisy image that can be sampled at different spatial frequencies. At each spatial frequency, a peak signal-to-noise ratio (PSNR) can be used to evaluate the amount of noise introduced by color correction. The color correction parameters can be optimized by using a genetic process. A two-step parameter optimization method can be used that avoid the optimization process being trapped in local optima. The present systems and methods advantageously are suitable for use, for example, by unmanned aerial vehicles (UAVs) and other mobile platforms.

Turning now to FIG. 1, an exemplary color correction apparatus 100 is shown as including a processor 110 and a memory 120. The processor 110 can comprise any type of processing system. Exemplary processors 110 can include, without limitation, one or more general purpose microprocessors (for example, single or multi-core processors), application-specific integrated circuits, application-specific instruction-set processors, graphics processing units, physics processing units, digital signal processing units, coprocessors, network processing units, audio processing units, encryption processing units, and the like. In certain embodiments, the processor 110 can include an image processing engine or media processing unit, which can include specialized hardware for enhancing the speed and efficiency of certain operations for image capture, image filtering, and image processing. Such operations include, for example, Bayer transformations, demosaicing operations, white balancing operations, color correction operations, noise reduction operations, and/or image sharpening/softening operations. In certain embodiments, the processor 110 can include specialized hardware and/or software for performing various color correction parameter calibration functions and operations described herein. Specialized hardware can include, but are not limited to, specialized parallel processors, caches, high speed buses, and the like.

The memory 120 can comprise any type of memory and can be, for example, a random access memory (RAM), a static RAM, a dynamic RAM, a read-only memory (ROM), a programmable ROM, an erasable programmable ROM, an electrically erasable programmable ROM, a flash memory, a secure digital (SD) card, and the like. In some embodiments, the memory 120 has a storage capacity that accommodates the needs of the color correction parameter calibration functions and operations described herein. The memory 120 can have any commercially-available memory capacity suitable for use in image processing applications and, in some embodiments, has a storage capacity of at least 512 Megabytes, 1 Gigabyte, 2 Gigabytes, 4 Gigabytes, 16 Gigabytes, 32 Gigabytes, 64 Gigabytes, or more. In some embodiments, the memory 120 can be a non-transitory storage medium that can store instructions for performing any of the processes described herein.

The color correction apparatus 100 can further include any hardware and/or software desired for performing the color correction parameter calibration functions and operations described herein. For example, the color correction apparatus 100 can include one or more input/output interfaces (not shown). Exemplary interfaces include, but are not limited to, universal serial bus (USB), digital visual interface (DVI), display port, serial ATA (SATA), IEEE 1394 interface (also known as FireWire), serial, video graphics array (VGA), super video graphics array (SVGA), small computer system interface (SCSI), high-definition multimedia interface (HDMI), audio ports, and/or proprietary input/output interfaces. As another example, the color correction apparatus 100 can include one or more input/output devices (not shown), for example, buttons, a keyboard, keypad, trackball, displays, and/or a monitor. As yet another example, the color correction apparatus 100 can include hardware for communication between components of the color correction apparatus 100 (for example, between the processor 110 and the memory 120).

Figure 2:
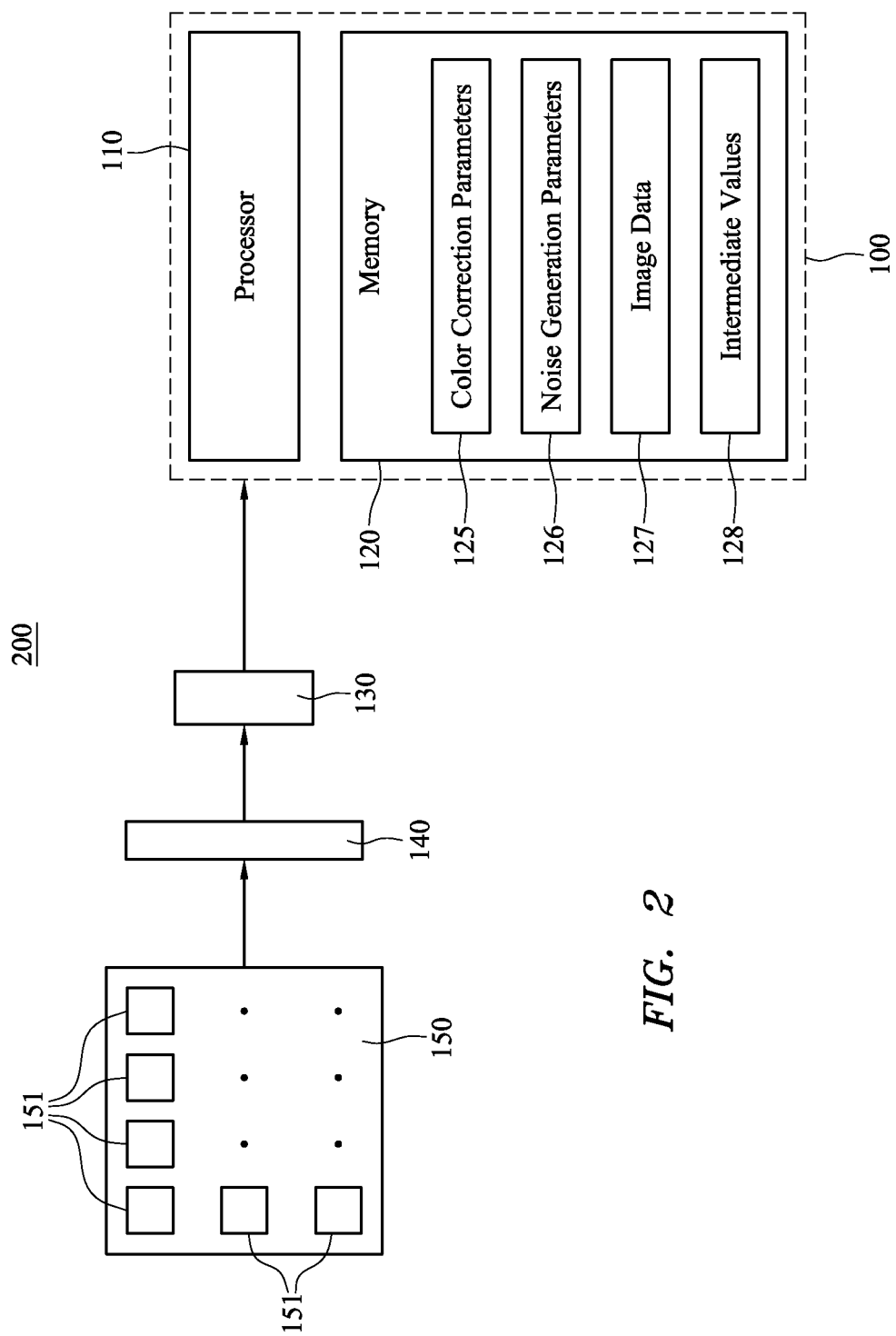
FIG. 2 is an exemplary diagram illustrating an embodiment of an imaging system including the color correction apparatus of FIG. 1, wherein the imaging system is shown imaging a color reference using an image sensor.

Turning now to FIG. 2, an exemplary embodiment of an imaging system 200 is shown as including a color correction apparatus 100, an image sensor 130, and a color filter 140. The color correction apparatus 100 can be provided in the manner discussed in more detail above with reference to FIG. 1. The memory 120 of the color correction apparatus 100 is shown as storing color correction parameters 125, noise generation parameters 126, pre-correction and post-correction image data 127, and intermediate values 128 produced during various color correction parameter calibration functions and operations described herein. The image sensor 130 can perform the function of sensing light and converting the sensed light into electrical signals that can be rendered as an image. Various image sensors 130 are suitable for use with the disclosed systems and methods, including, but not limited to, image sensors 130 used in commercially-available cameras and camcorders. Suitable image sensors 130 can include analog image sensors (for example, video camera tubes) and/or digital image sensors (for example, charge-coupled device (CCD), complementary metal-oxide-semiconductor (CMOS), N-type metal-oxide-semiconductor (NMOS) image sensors, and hybrids/variants thereof). Digital image sensors can include, for example, a two-dimensional array of photosensor elements that can each capture one pixel of image information. The resolution of the image sensor 130 can be determined by the number of photosensor elements. The image sensor 130 can support any commercially-available image resolution and, in some embodiments, has a resolution of at least 0.1 Megapixels, 0.5 Megapixels, 1 Megapixel, 2 Megapixels, 5 Megapixels, 10 Megapixels, or an even greater number of pixels. The image sensor 130 can have specialty functions for use in various applications such as thermography, creation of multi-spectral images, infrared detection, gamma detection, x-ray detection, and the like. The image sensor 130 can include, for example, an electro-optical sensor, a thermal/ infrared sensor, a color or monochrome sensor, a multi-spectral imaging sensor, a spectrophotometer, a spectrometer, a thermometer, and/or an illuminometer.

The color filter 140 is shown in FIG. 2 as separating and/or filtering incoming light based on color and directing the light onto the appropriate photosensor elements of the image sensor 130. For example, the color filter 140 can include a color filter array that passes red, green, or blue light to selected pixel sensors to form a color mosaic (not shown). The layout of different colors on the color mosaic can be arranged in any convenient manner, including a Bayer pattern. Once a color mosaic is formed, a color value of each pixel can be interpolated using any of various demosaicing methods that interpolate missing color values at each pixel using color values of adjacent pixels. As an alternative to filtering and demosaicing, the image sensor 130 can include an array of layered pixel photosensor elements that separates light of different wavelengths based on the properties of the photosensor elements. In either case, an image can be acquired by the image sensor 130 as intensity values in each of a plurality of color channels at each pixel.

The imaging system 200 is further shown in FIG. 2 as acquiring an image of a color reference 150 to perform calibration of color correction parameters 125. In some embodiments, the color reference 150 has a known reference color value $C_{ref}$ that is known or that can be otherwise determined in advance, making the color reference 150 suitable for use as a color standard. Stated somewhat differently, the reference color value $C_{ref}$ is a property of the color reference 150 that is independent of how the color reference 150 is imaged. The reference color value $C_{ref}$ can be designated based on an average human perception of the color reference 150. The reference color value $C_{ref}$ can thus serve as an objective measure how a color imaged by the image sensor 130 can be corrected so as to match the average human perception.

In some embodiments, the color reference 150 is, but not necessarily, homogeneous in color. In some embodiments, flatness of the color reference 150 is, though not essential, to avoid variations attributable to differential light scattering. The optical properties of the color reference 150 need not be ideal for purposes of performing color correction, so long as the optical properties do not interfere with imaging the color reference 150. The color reference 150 can be made of one or more of a variety of materials such as plastic, paper, metal, wood, foam, composites thereof, and other materials. Furthermore, the color, reflectance, and/or other optical properties of the color reference 150 can advantageously be calibrated as desired using an appropriate paint or other coating. In some embodiments, the color reference 150 can advantageously include multiple color patches 151, each of which has a different reference color value $C_{ref}$. This embodiment enables multiple color references 150 to be imaged at the same time, reducing the number of image capture operations for color correction. This embodiment is particularly suitable when a large number of color references 150 are to be imaged in order to calibrate color correction parameters 125 with greater accuracy. Commercially available color references 150 include, for example, MacBeth ColorChecker, MacBeth ColorChecker SG, and the like.

Although images acquired by the image sensor 130 are described above in an RGB (red, green, and blue) color space for illustrative purposes only, the images can be acquired in other color spaces, as well. The color space in which images are acquired depends generally on the properties of the image sensor 130 and any color filters 140.

Furthermore, the color space in which an image is acquired need not be three-dimensional but can have any number of dimensions as desired to capture the spectral composition of the image. The number of dimensions can depend on the number of color channels of the image sensor 130. The color space of an acquired image can be one-dimensional, two-dimensional, three-dimensional, four-dimensional, five-dimensional, or more.

Once acquired by the image sensor 130, an image can be converted between color spaces as desired for processing and/or calibration. For example, a conversion from a sRGB color space with coordinates ($R_{sRGB}$, $G_{sRGB}$, $B_{sRGB}$) to a CIE 1931 XYZ color space with coordinates (X, Y, Z) entails a linear conversion, which can be represented by the following three-dimensional matrix:

$$\begin{bmatrix} X \\ Y \\ Z \end{bmatrix} = \begin{bmatrix} 0.4124 & 0.3576 & 0.1805 \\ 0.2126 & 0.7152 & 0.0722 \\ 0.0193 & 0.1192 & 0.9505 \end{bmatrix} \begin{bmatrix} R_{sRGB} \\ G_{sRGB} \\ B_{sRGB} \end{bmatrix} \quad \text{Equation (1)}$$

In some embodiments, it can be desirable to express the color of an image in a non-linear color space. One suitable non-linear color space for imaging applications is a CIE L*a*b* color space (for example, a CIE 1976 L*a*b* color space) as defined by the International Commission on Illumination. The color of an image in a CIE L*a*b* color space can be computed from the colors of the image in a CIE 1931 XYZ color space using the following non-linear transformation:

$$L^* = 116 f\left(\frac{Y}{Y_n}\right) - 16 \quad \text{Equation (2)}$$

$$a^* = 500\left[f\left(\frac{X}{X_n}\right) - f\left(\frac{Y}{Y_n}\right)\right] \quad \text{Equation (3)}$$

$$b^* = 200\left[f\left(\frac{Y}{Y_n}\right) - f\left(\frac{Z}{Z_n}\right)\right] \quad \text{Equation (4)}$$

$$\text{where } f(t) = \begin{cases} t^{1/3} & \text{if } t > \left(\frac{6}{29}\right)^3 \\ \frac{1}{3}\left(\frac{29}{6}\right)^2 t + \frac{4}{29} & \text{otherwise} \end{cases} \quad \text{Equation (5)}$$

In the above equations (2)-(5), $X_n$, $Y_n$, and $Z_n$ are the CIE XYZ values of the color at a reference white point. The CIE L*a*b* color space is designed to mimic the color response of human perception. The non-linearity of the transformation from the CIE XYZ color space to the CIE L*a*b* color space reflects the nonlinearity of human perception. Representing a color in the CIE L*a*b* color space has the advantage that the CIE L*a*b* color space is perceptually uniform to human beings, meaning that a change of a given amount in a color value will produce a proportional change of visual significance. Accordingly, calibration of color correction parameters 125 can advantageously be performed after converting input and reference colors into a CIE L*a*b* color space representation.

In some embodiments, it can be desirable to express the color of an image in a YUV color space (for example, a Y'UV color space). The YUV color space is represented by one luminance component Y representing image brightness and two chrominance components U and V representing image color. A conversion from a RGB color space with coordinates (R, G, B) to a YUV color space with coordinates (Y, U, V) entails a linear conversion, which can be represented by the following three-dimensional matrix:

$$\begin{bmatrix} Y \\ U \\ V \end{bmatrix} = \begin{bmatrix} 0.299 & 0.587 & 0.114 \\ -0.14713 & -0.28886 & 0.436 \\ 0.615 & -0.51499 & -0.10001 \end{bmatrix} \begin{bmatrix} G \\ B \\ R \end{bmatrix} \quad \text{Equation (6)}$$

Although conversions between specific color spaces are shown and described for illustrative purposes only, an image can be converted from any first predetermined color space to any other second predetermined color space as desired.

Figure 3:
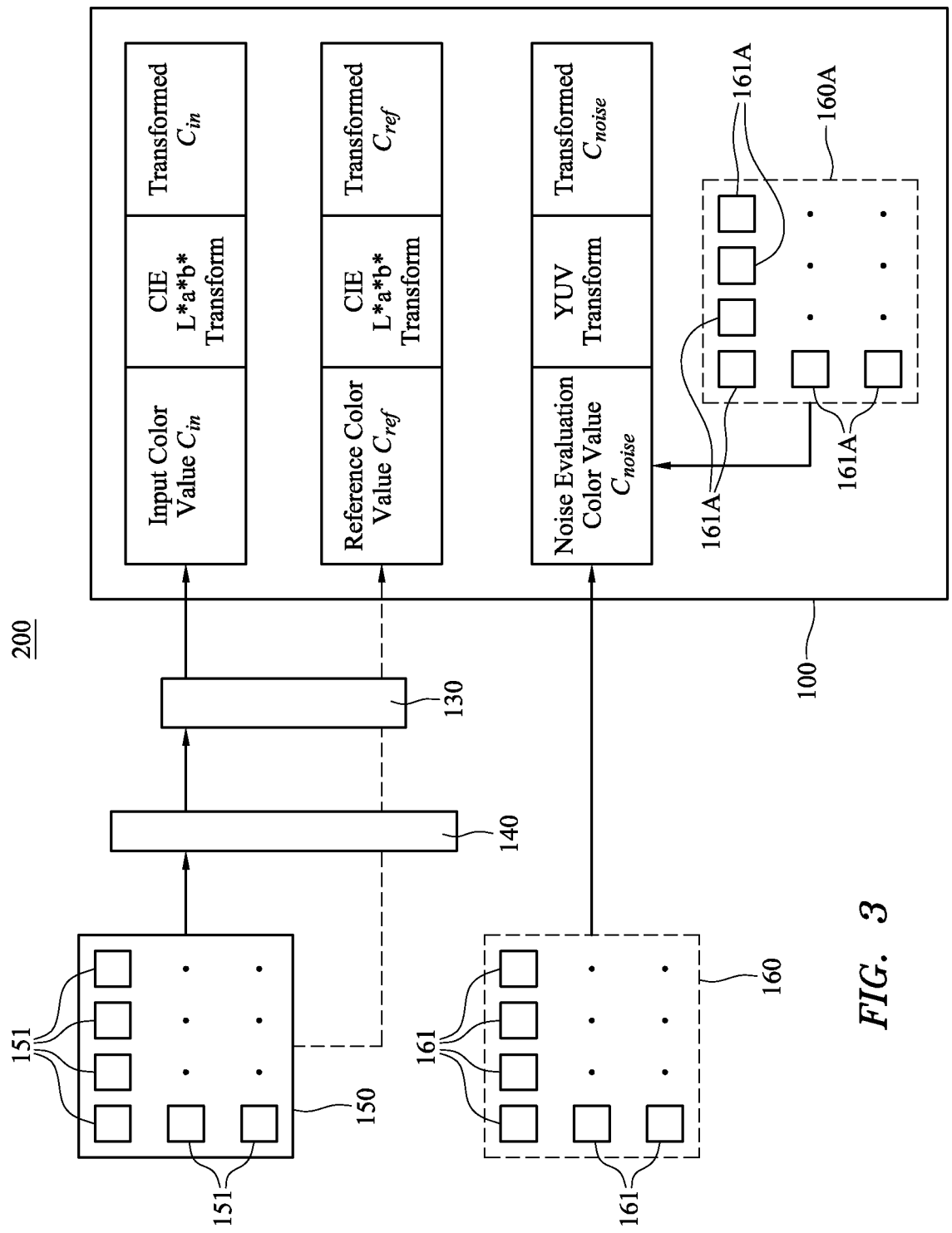
FIG. 3 is an exemplary diagram illustrating an alternative embodiment of the imaging system of FIG. 2, wherein the color correction apparatus is shown as acquiring various color values for calibration of color correction parameters.

Turning now to FIG. 3, an alternative embodiment of the imaging system 200 is shown. The imaging system 200 of FIG. 3 includes a color correction apparatus 100, which is shown as obtaining several inputs for calibration of color correction parameters 125. Without limitation, an image sensor 130 is shown as acquiring an image of a color reference 150. The image is then passed to the color correction apparatus 100, which can obtain an input color value $C_{in}$ of the image. The input color value $C_{in}$ represents a pre-color-corrected value that reflects the image acquisition properties of the image sensor 130, filtering properties of an image filter 140, as well as any other optical properties of the imaging system 200. In one embodiment, the input color value $C_{in}$ can be transformed from the color space of the color reference image to a non-linear color space—for example, a CIE L*a*b* color space. The transformation can be performed, for example, by first using a linear transformation from a RGB color space to an intermediate CIE XYZ color using Equation (1) shown above. The color values in the intermediate CIE XYZ color space can be non-linearly transformed to a CIE L*a*b* color space as shown above in Equations (2)-(5). Such transformations can be performed on a processor 110 (shown in FIG. 1) of the color correction apparatus 100.

Similarly, the color correction apparatus 100 can obtain a reference color value $C_{ref}$ that corresponds to the input color value $C_{in}$ for color reference 150. If desired, the reference color value $C_{ref}$ can be transformed into a non-linear color space—for example, the CIE L*a*b* color space. In some embodiments, the reference color value $C_{ref}$ advantageously can be directly inputted into the color correction apparatus 100 in the CIE L*a*b* color space, thereby making the transformation step unnecessary.

In FIG. 3, the color correction apparatus 100 is further shown as obtaining noise evaluation color values $C_{noise}$ from a noise evaluation image 160. The noise evaluation image 160 can be any image containing noise. As color correction tends to amplify noise, the noise evaluation image 160 can be used to calibrate color correction parameters 125 in order to limit noise amplification. Stated somewhat differently, the noise evaluation image 160 can used to evaluate now noise is amplified with a given set of color correction parameters 125 (shown in FIG. 2), and thereby select a set of color correction parameters 125 with reduced noise amplification. In one embodiment, the noise evaluation color values $C_{noise}$ can be transformed into the YUV color space, as further described below with reference to FIG. 7. The transformation can be performed, for example, using the linear transformation from the RGB color space to the YUV color space shown above in Equation (6). This transformation can be performed using the processor 110 of the color correction apparatus 100.

In one embodiment, the noise evaluation image 160 can be an image acquired by the image sensor 130 with or without filtering through the color filter 140. In some embodiments, the noise evaluation image 160 is an image of the color reference 150. Imaging the color reference 150 advantageous allows the simultaneous determination of the input color values $C_{in}$ and the noise evaluation color values $C_{noise}$.

Alternatively and/or additionally, the noise evaluation image 160 can be a virtual noise evaluation image 160A. The virtual noise evaluation image 160A can be generated by the color correction apparatus 100 using a pre-determined set of noise generation parameters 126 (shown in FIG. 2). The noise generation parameters 126 can, for example, reflect the distribution of the noise that is generated virtually (for example, Poisson or Gaussian noise). The specific noise generation parameters 126 can reflect the types of noise that the imaging system 200 can be expected to encounter in usage. A virtual noise evaluation image 160A can be used because the evaluation of noise amplification does not require information about the color of an underlying object that is imaged. Instead, an arbitrary image containing noise can be evaluated for how the noise of that image would be amplified under a given set of color correction parameters 125. For example, the noise evaluation color values $C_{noise}$ of the virtual noise evaluation image 160A can be represented as follows:

$$C_{noise} = C_{noise\_free} + n \quad \text{Equation (7)}$$

where $C_{noise\_free}$ represents the color of the virtual noise evaluation image 160A before noise is added, and n represents the noise added.

Once the inputs for color correction parameter calibration (for example, input color values $C_{in}$, reference color values $C_{ref}$, and noise evaluation color values $C_{noise}$) are obtained by the color correction apparatus 100, these inputs can be stored for later use by the color correction apparatus 100 (for example, in a memory 120 as shown in FIG. 1). For example, the inputs for color correction parameter calibration can be obtained as part of an initialization process for a new imaging device 200 prior to usage. The inputs for color correction parameter calibration can be stored in the memory 120 and called upon periodically to re-calibrate the color correction parameters 125 as desired (for example, as image response characteristics of the imaging device 200 change after wear and tear). The inputs for color correction parameter calibration can be, but do not need to be, re-obtained for each new color correction parameter calibration.

Turning now to FIG. 4, an exemplary top-level method 400 of calibrating color correction parameters 125 is shown. The method 400 advantageously can be applied to calibrating the color correction parameters 125 for a digital imaging device 200 (shown in FIGS. 2 and 3). At 401, input color values $C_{in}$ and reference color values $C_{ref}$ are obtained for each of a plurality of color references 150 (shown in FIGS. 2 and 3). In some embodiments, the input color values $C_{in}$ and reference color values $C_{ref}$ are obtained or transformed into a non-linear color space—for example, a CIE L*a*b* color space—as described above with reference to FIG. 3. Additionally, a noise evaluation image 160 having a color noise for evaluating noise reduction is obtained.

At 402, a plurality of color correction parameters 125 are adjusted so as to optimize a fitness function J. In some embodiments, the fitness function J can comprise a color correction error $e_{color}$ and/or a noise amplification metric $D_{noise}$ based on the input color values $C_{in}$, the reference color values $C_{ref}$, and the noise evaluation image 160. An exemplary embodiment of the adjusting is described in more detail below with respect to FIG. 5.

Figure 5:
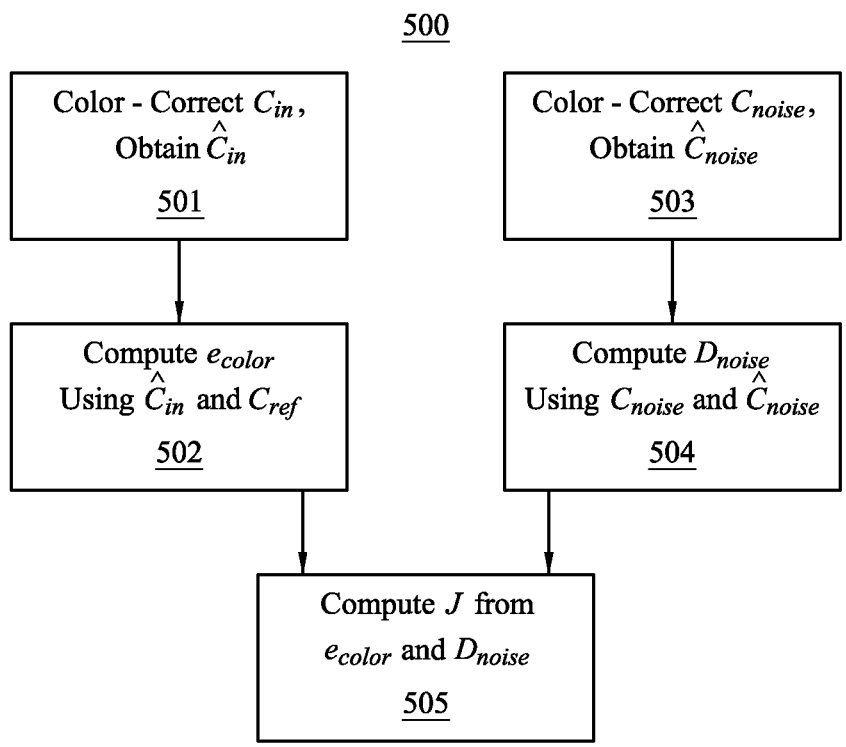
FIG. 5 is exemplary flow chart illustrating an alternative embodiment of the method of FIG. 4, wherein color correction parameters are optimized for calibrating a digital imaging device.

Turning now to FIG. 5, an exemplary method 500 of calibrating color correction parameters 125 (shown in FIG. 2) for a digital imaging device 200 (shown in FIGS. 2 and 3) is shown. At 501, input color (or pre-correction) values $C_{in}$ for a color references 150 are color corrected using the current values of the color correction parameters 125 to obtain post-correction input color values $\hat{C}_{in}$. This operation can be represented as:

$$\hat{C}_{in} = CC(C_{in}) \quad \text{Equation (8)}$$

In the above equation (8), CC represents a color correction operation. The specific implementation of the color correction operation CC depends on the underlying form of the color correction parameters 125. In one embodiment, the color correction parameters 125 can take the form of a matrix having dimensions n×m, where m is dimensionality of the pre-correction color value and n is the dimensionality of the post-correction color value. In this embodiment, the color correction operation CC will take the form of a matrix multiplication that transforms an m-dimensional color value vector into an n-dimensional color value vector. In some embodiments, the pre-correction color value and the post-correction color value have the same dimensionality, in which case CC will take the form of a square matrix. In some embodiments, the pre-correction color value and the post-correction color value are each three-dimensional (for example, for color values in the RGB, CIE XYZ, CIE L*a*b*, and LUV color spaces), in which case CC will take the form of a 3×3 matrix. An advantage of using a matrix is that a matrix can describe a color correction operation CC using only n×m correction parameters 125, allowing decreased memory usage. However, linear color correction using a matrix may be unsuitable for some applications.

In another embodiment, the color correction parameters 125 can take the form of a look-up table (LUT) indexed in m dimensions that contains ordered m-tuples $(a_1, a_2, \ldots, a_m)$ each mapping to an n-dimensional vector, where m is dimensionality of the pre-correction color value and n is the dimensionality of the post-correction color value. In some embodiments, the look-up table is three-dimensional, that is, indexed in three dimensions. An advantage of using a look-up table to implement the color correction parameters 125 is that a look-up table can account for a non-linear relationship between a pre-correction color value and a post-correction color value. Furthermore, since the entries in the look-up table are discrete, interpolation operations can be performed when pre-correction color values fall in between discrete entries. Such interpolation operations can include finding look-up table entries that have the closest distance (for example, Euclidian distance) to the pre-correction color value, and interpolating a corrected color value using the closest look-up table entries. For example, linear interpolations can be performed for one-dimensional look-up tables, and multi-linear interpolations can be performed for look-up tables in higher dimensions. In this embodiment, the color correction operation CC will take the form of a look-up operation in the look-up table, followed by an interpolation operation, if desired. The color correction parameters 125 can be implemented in multiple ways simultaneously; for example, a combination of a matrix and a look-up table can be used.

In one embodiment, a Shepard interpolation can be used to perform color correction where the color correction parameters 125 take the form of a look-up table (LUT). In one embodiment, a color-corrected value for a given color p can be found as follows:

$$f(p) = \frac{\sum_{i=1}^{n} \hat{f}(c_i) w_i(\|p - c_i\|)}{\sum_{i=1}^{n} w_i(\|p - c_i\|)} \quad \text{Equation (9)}$$

In the above equation (9), i is an index over the different input color values $C_{in}$ and their corresponding reference color values $C_{ref}$, $c_i$ represents the ith value of the input color values $C_{in}$, $\hat{f}(c_i)$ represents the ith value of the reference color values $C_{ref}$, ($\|p-c_i\|$) represents a distance (for example, a Euclidian distance) between the given color p and $c_i$, and $w_i$ represents a weight of the ith input color value $C_{in}$.

At 502, the post-correction input color values $\hat{C}_{in}$ are compared with the reference color values $C_{ref}$, and the color correction error $e_{color}$ is computed based on the comparison. For example, where the post-correction input color values $\hat{C}_{in}$ and reference color values $C_{ref}$ are represented in a CIE L*a*b* color space, the color correction error $e_{color}$ can be expressed as:

$$e_{color} = \sqrt{\sum_j^{j \in \{L^*, a^*, b^*\}} (C_{in\_j} - \hat{C}_{in\_j})^2} \quad \text{Equation (10)}$$

In the above equation (10), $C_{in\_j}$ and $\hat{C}_{in\_j}$ represent the jth component of the reference color values $C_{ref}$ and the post-correction input color values $\hat{C}_{in}$, respectively. Stated somewhat differently, the color correction error $e_{color}$ is the Euclidian distance between the post-correction input color values $\hat{C}_{in}$ and the reference color values $C_{ref}$ in the color space in which the color values are represented. Where the color correction error $e_{color}$ is to be determined over multiple color references 150 (or, equivalently, over multiple color patches 151 of a given color reference 150), the color correction error $e_{color}$ can be taken as a weighted and/or unweighted average over the color patches 151.

At 503, noise evaluation color values $C_{noise}$ are color corrected using the current values of the color correction parameters 125 to obtain post-correction noise evaluation color values $\hat{C}_{noise}$. This operation can be represented as:

$$\hat{C}_{noise} = CC(C_{noise}) \quad \text{Equation (11)}$$

In the above equation (11), CC represents a color correction operation as described above with reference to 501. The specific color correction operation CC depends on the implementation of the color correction parameters 125 and, as described above with reference to 501, can take the form of a matrix or a look-up table with each form having respective advantages.

At 504, the post-correction noise evaluation color values $\hat{C}_{noise}$ are compared with pre-correction noise evaluation color values $C_{noise}$, and the noise amplification metric $D_{noise}$ is found based on the comparison. The noise amplification metric $D_{noise}$ can be any measure of the distance between post-correction noise evaluation color values $\hat{C}_{noise}$ and the pre-correction noise evaluation color values $C_{noise}$. That is, the greater the value of the noise amplification metric $D_{noise}$, the more noise is amplified after applying a color correction.

Where the noise amplification metric $D_{noise}$ is to be determined over multiple color references 150 (or, equivalently, over multiple color patches 151 of a given color reference 150), the noise amplification metric $D_{noise}$ can be taken as a weighted and/or unweighted average over the color patches 151. In one embodiment, the noise amplification metric $D_{noise}$ can be taken as a weighted average over the color patches 151.

$$D_{noise} = \frac{\sum_{i=1}^{N} \omega_i D_i}{\sum_{i=1}^{N} \omega_i} \qquad \text{Equation (12)}$$

In the above equation (12), i is an index over the color patches 151, N is the total number of color patches 151, $D_i$ is the noise amplification metric for color patch i, and $\omega_i$ is a non-negative weight for color patch i. The weights $\omega_i$ can be set according to the sensitivity of the average human perception to the color of each color patch 151. For example, colors having greater sensitivity of human perception can be given greater weights $\omega_i$.

At 505, a fitness function J can be determined. In some embodiments, the fitness function J can be found as a weighted and/or unweighted sum of the color correction error $e_{color}$ and the noise amplification metric $D_{noise}$. For example, an unweighted fitness function J can be represented as the following sum:

$$J = e_{color} + D_{noise} \qquad \text{Equation (13)}$$

In some embodiments, a weighted fitness function J can used to advantageously weight the color correction error $e_{color}$ more than the noise amplification metric $D_{noise}$, or vice versa. The amount of weighting for the fitness function J can be determined, for example, by repeating a color correction parameter calibrations for different weights and taking the weight that gives the best (for example, the lowest) value of the fitness function J. Alternatively and/or additionally, the amount of weighting for the fitness function J can be determined based on prior color correction parameter calibrations (for example, using different imaging devices).

Figure 6:
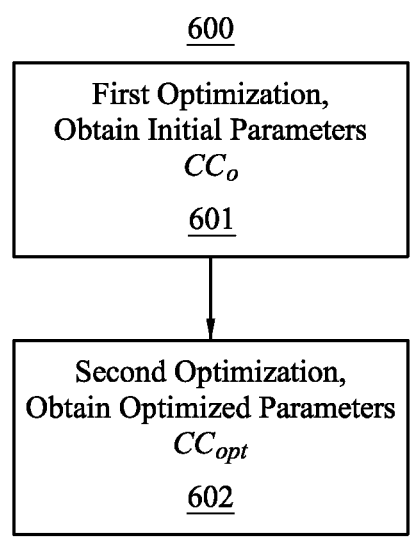
FIG. 6 is exemplary flow chart illustrating an alternative embodiment of the method of FIG. 5, wherein the method includes a two-step optimization method.

Turning now to FIG. 6, an exemplary method 600 for calibrating color correction parameters 125 (shown in FIG. 2) is shown as including two steps. At 601, a first optimization process is applied to obtain initial values $CC_0$ for the color correction parameters 125. In some embodiments, the first optimization samples broadly the space of possible color correction parameter values so as to avoid becoming trapped in local optima. Any of various optimization processes can be used in the first optimization at 601, including a genetic process, a simulated annealing method, and other non-greedy methods that avoid local optima. At 602, a second optimization process is applied using the initial values $CC_0$ as a starting point to obtain further optimized values $CC_{opt}$ for the color correction parameters 125. At the second optimization, at 602, a goal is to find the local optimum value. Accordingly, direct optimization methods are suitable for the second optimization at 602. Exemplary direct optimization methods include, but are not limited to, gradient descent methods.

Figure 7:
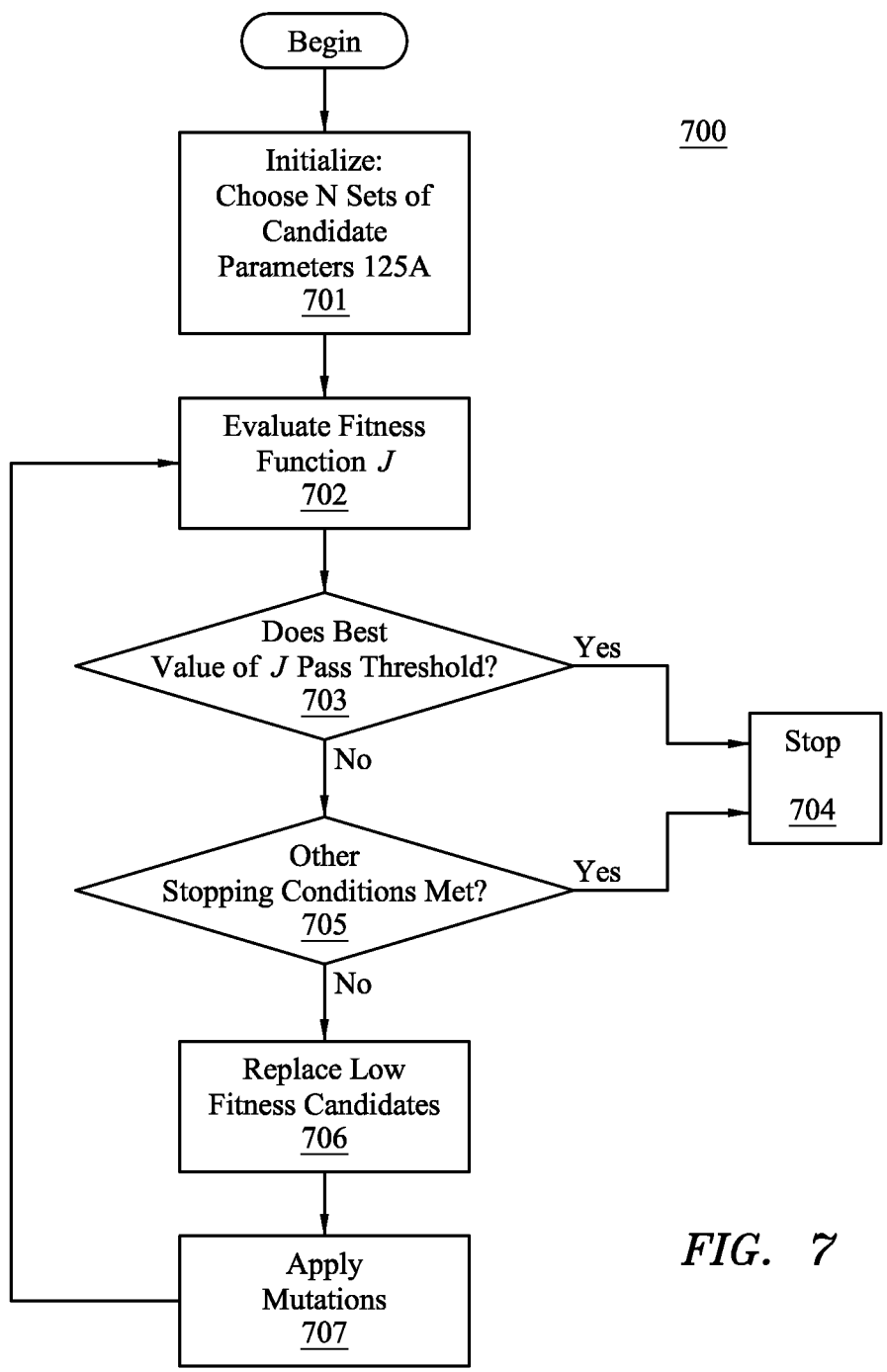
FIG. 7 is exemplary flow chart illustrating another alternative embodiment of the method of FIG. 5, wherein the method includes a genetic process.

Turning now to FIG. 7, an exemplary genetic process 700 is shown for calibrating color correction parameters 125 (shown in FIG. 2). A genetic process is an optimization method loosely based on evolutionary principles in biology, where possible solutions to a problem are generated as members of a "population," and the members are selected based on a fitness function over a number of selection rounds. The genetic process 700 can be used to find an optimal solution to the problem of selecting a set of color correction parameters 125 to optimize (for example, minimize) the fitness function J that includes a color correction error $e_{color}$ and a noise amplification metric $D_{noise}$. At 701, a predetermined number N of initial sets of candidate color correction parameters 125A are selected as the initial "population" of solutions. The predetermined number N can comprise any suitable number of initial sets and, for example, can be at least 10, 50, 100, 500, 1000, or more. The initial population of the N sets of candidate color correction parameters 125A can be selected, for example, by sampling the space of possible parameters at specified intervals. Alternatively and/or additionally, the sampling can be done at random.

At 702, the fitness function J is evaluated for the members of the "population," that is, for each of the N sets of candidate color correction parameters 125A. From among the N initial sets of candidate color correction parameters 125A, the initial set that has the best value of the fitness function J (for example, the minimal value, if the fitness function J to be minimized) is chosen. At 703, if the best value passes a predefined threshold, the genetic process stops at 704. Alternatively and/or additionally, at 705, if certain conditions are met (for example, the genetic process has been run for more than a certain number of rounds, or the genetic process has not produced more than a specific amount of improvement in the fitness function J from the prior round), the genetic process stops at 704. After the genetic process stops, at 704, the candidate color correction parameters 125A giving the best value of the fitness function J is declared to be the "winner," and these candidate color correction parameters 125A can be outputted and/or used as a starting point for further optimization.

If the "best" candidate correction parameters 125 do not pass a predefined threshold and/or certain conditions for stopping the genetic process, at 703, are not met, the genetic process continues, at 706, by discarding and replacing candidate color correction parameters 125A having the lowest values of the fitness function J. In one embodiment, a given percentile of the candidate color correction parameters 125A having the lowest fitness function J can be discarded and replaced with new candidate color correction parameters 125A. The new candidate color correction parameters 125A can, for example, be generated in the same way as the initial candidate color correction parameters 125A. In some embodiments, at least 10%, 20%, 30%, 40%, 50%, or more the lowest scoring fitness functions J can be discarded.

At 707, "mutation" operations can be applied to the candidate color correction parameters 125A, simulating biological mutations of chromosomes between successive generations of individuals. Here, each set of candidate color correction parameters 125A can be conceptually treated as a "chromosome" that is also subject to mutation. Mutations to the candidate color correction parameters 125A include, for example, "point mutations" changing individual parameters at random and/or "crossover" mutations between two sets of candidate color correction parameters 125A. For example, where the candidate color correction parameters 125A take the form of a matrix, a crossover can be performed by swapping corresponding rows and/or columns or portions thereof between two candidate matrices. Where the candidate color correction parameters 125A take the form of a look-up table, a crossover can be performed by swapping one or more corresponding entries in the look-up table. Once the mutations are applied to the candidate color correction parameters 125A, the method 700 can return to 702 for evaluating the fitness function J for the new round of the genetic process.

The noise amplification metric $D_{noise}$ can be determined using any suitable approach, including but not limited to using peak signal-to-noise ratios (PSNR) and/or color variances.

Figure 8:
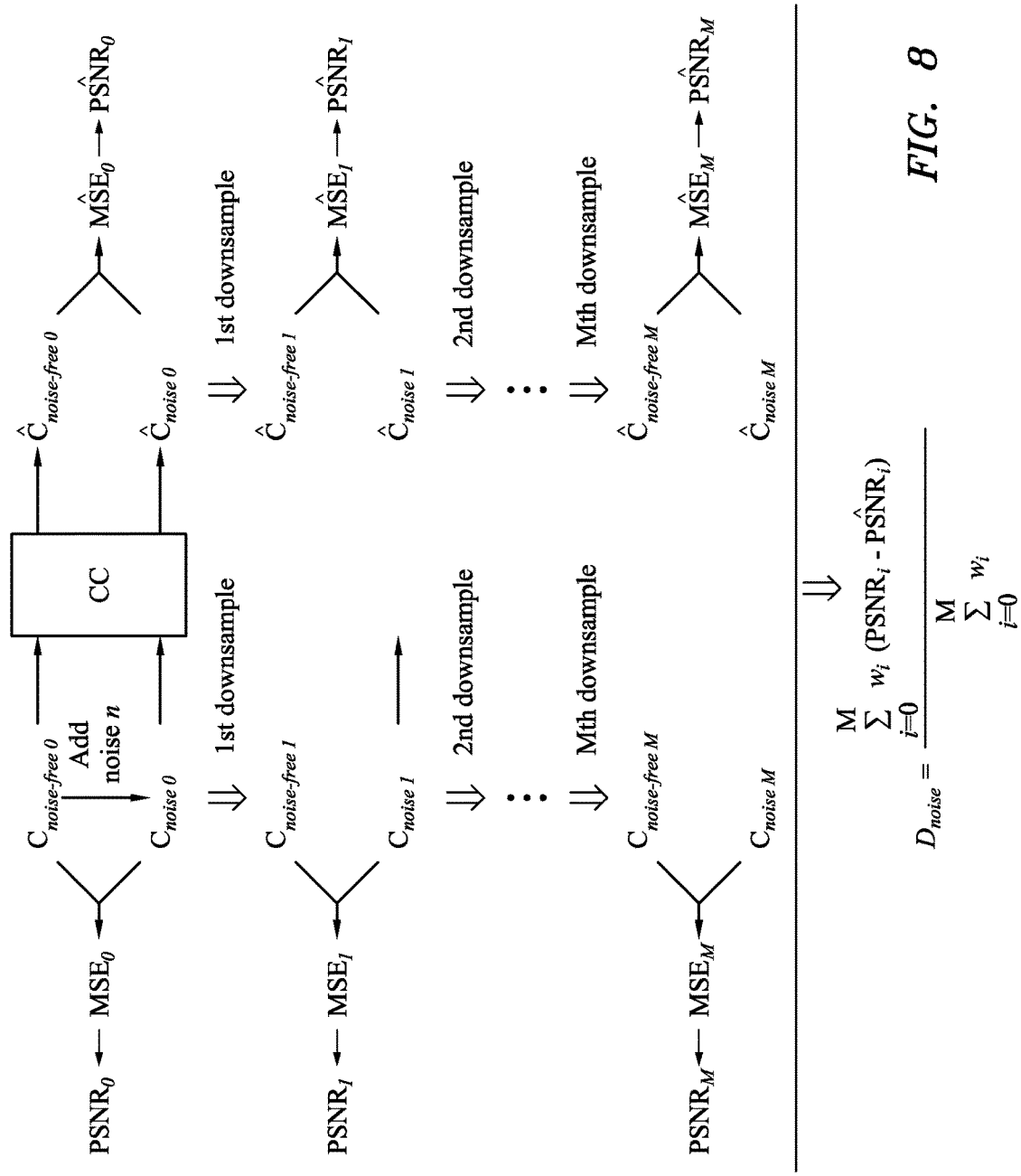
FIG. 8 is an exemplary diagram illustrating an embodiment of the method of FIG. 5, wherein the method includes sampling at different spatial frequencies to determine a noise amplification metric.

Turning now to FIG. 8, an exemplary diagram is shown for finding the noise amplification metric $D_{noise}$ using a peak signal-to-noise ratios (PSNR). Beginning with noise-free color values $C_{noise\_free}$, noise-evaluation color values $C_{noise}$ can be found by adding noise n, as described in Equation (7). A color correction CC can be applied to the noise-free color values $C_{noise\_free}$ and noise-evaluation color values $C_{noise}$, respectively, to find corresponding post-correction values of the noise-free color values $\hat{C}_{noise\_free}$ and noise evaluation color values $\hat{C}_{noise}$. For example, the color correction is shown in Equation (11) and in Equation (14) below:

$$\hat{C}_{noise\_free} = CC(C_{noise\_free}) \qquad \text{Equation (14)}$$

Based on the parameters $C_{noise\_free}$, $C_{noise}$, $\hat{C}_{noise\_free}$, and $\hat{C}_{noise}$, a pair of PSNR values PSNR and $\widehat{PSNR}$ can be found through determining a mean squared error (MSE), as shown in Equations (15) through (18):

$$MSE = \frac{\|c_{noise} - c_{noise\_free}\|_2^2}{\Sigma_j s_j} \qquad \text{Equation (15)}$$

$$PSNR = 10\log_{10}\left(\frac{MAX_I^2}{MSE}\right) \qquad \text{Equation (16)}$$

In the above equations (15)-(16), S, i.e. $\Sigma_j$ $S_j$, is the number of pixels and $MAX_I$ is the maximum value of $C_{noise}$ and $C_{noise\_free}$, and j is an index over virtual color patches.

$$\widehat{MSE} = \frac{\|\hat{c}_{noise} - \hat{c}_{noise\_free}\|_2^2}{\Sigma_j s_j} \qquad \text{Equation (17)}$$

$$\widehat{PSNR} = 10\log_{10}\left(\frac{MAX_I^2}{\widehat{MSE}}\right) \qquad \text{Equation (18)}$$

In the above equations (17)-(18), S, i.e. $\Sigma_j$ $S_j$, is the number of pixels and $MAX_I$ is the maximum value of $\hat{C}_{noise}$ and $\hat{C}_{noise\_free}$, and j is an index over virtual color patches.

In some embodiments, determining the noise amplification metric $D_{noise}$ can include finding a PSNR difference that is a difference between a PSNR for the pre-correction noise evaluation image and a $\widehat{PSNR}$ for the corrected noise evaluation image.

Figure 9:
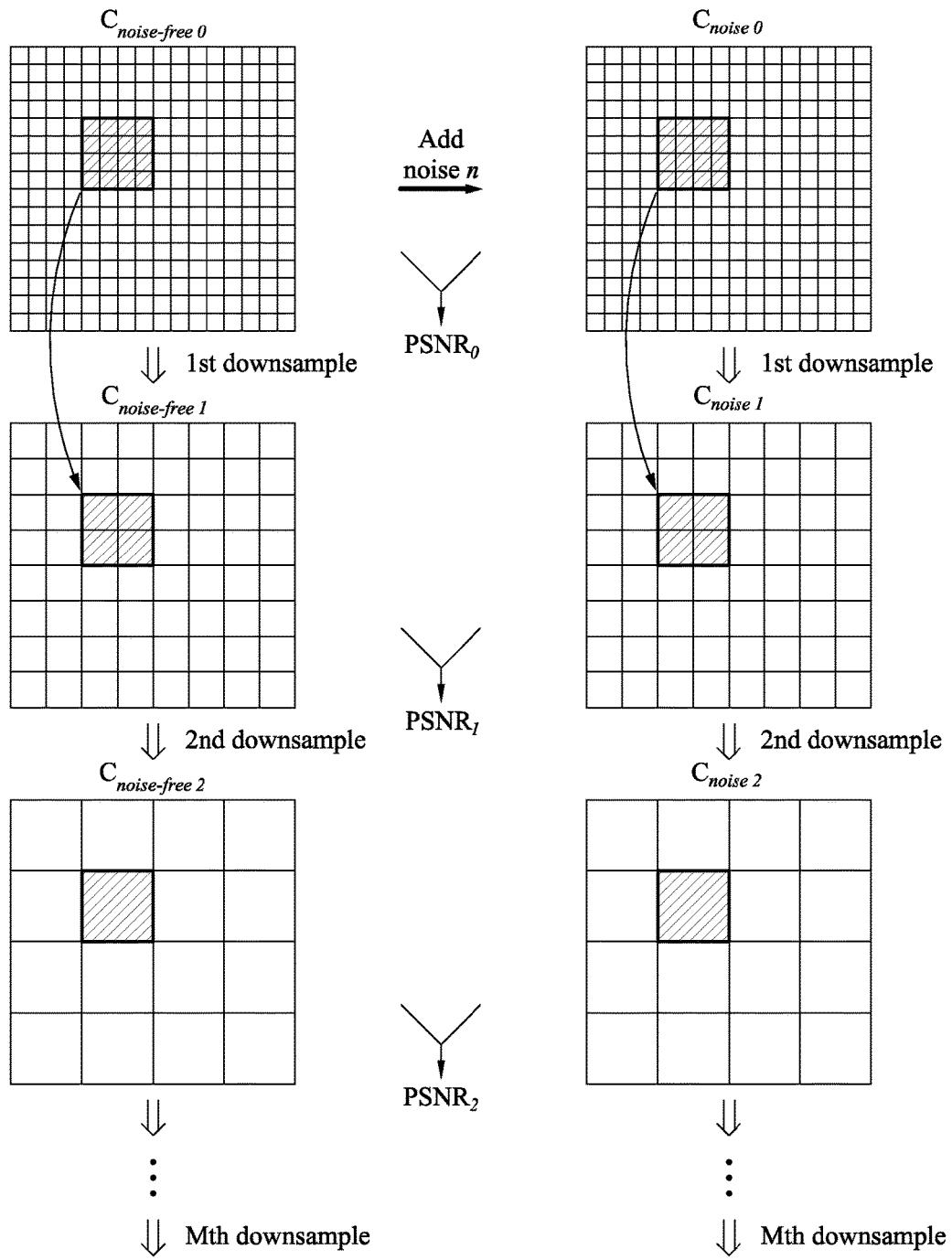
FIG. 9 is an exemplary diagram illustrating an embodiment of the method of FIG. 8 with spatial downsampling.

In some embodiments, the noise amplification metric $D_{noise}$ can be determined by downsampling. For example, the downsampling can be a spatial downsampling, as illustrated in FIG. 9. In particular, FIG. 9 illustrates an embodiment of downsampling in which an image (for example, images having pre-correction noise evaluation color values $C_{noise}$, or pre-correction noise-free color values $C_{noise\_free}$) is sample at every other pixel in a first downsampling. In some embodiments, the downsampled image can be downsampling again, and the downsampling process can be repeated as often as desired up to Miterations. Although not shown in FIG. 9, a similar downsampling process can be performed for images that have been color-corrected (for example, images having post-correction noise evaluation color values $\hat{C}_{noise}$ or post-correction noise-free color values $\hat{C}_{noise\_free}$. Since downsampling be an iterative process, color values and PSNR values at particular iterations are denoted with a subscript from 0 to M corresponding to the iteration, as shown in FIGS. 8-9.

After each round of downsampling, the downsampled images can be used to determine one or more downsampled PSNRs as well as a downsampled PSNR difference. Returning to FIG. 8, pre-correction noise-free color values $C_{noise\_free_1}$ and pre-correction noise evaluation color values $C_{noise_1}$ that have undergone one round of downsampling can be used to find a corresponding downsampled $PSNR_1$. Likewise, post-correction noise-free color values $\hat{C}_{noise\_free_1}$ and post-correction noise evaluation color values $\hat{C}_{noise_1}$ that have undergone one round of downsampling can be used to find a corresponding downsampled $\widehat{PSNR}_1$. After M downsampling rounds, a set of PSNR values $PSNR_i$. and $\widehat{PSNR}_i$ will be obtained, where i ranges from 0 to M. The set of PSNR values can be used to find corresponding PSNR differences for value of i ranging from 0 to M, where i=0 corresponds to a PSNR difference that has not been downsampled, and i=m corresponds to a PSNR difference that has been downsampled m times.

In some embodiments, the noise amplification metric $D_{noise}$ can be obtained by taking a weighted average of a PSNR difference and at least one downsampled PSNR difference. In some embodiments, the noise amplification metric $D_{noise}$ can be obtained by taking a weighted average of the PSNR difference and the plurality of successively downsampled PSNR differences. The weight applied to each PSNR difference and/or downsampled PSNR difference can represented as $w_i$, where i ranges from 0 to M. An exemplary method of finding the noise amplification metric $D_{noise}$ is shown as follows in Equation (19), which is reproduced in FIG. 8:

$$D_{noise} = \frac{\Sigma_{i=0}^M w_i(PSNR_i - \widehat{PSNR}_1)}{\Sigma_{i=0}^M w_i} \qquad \text{Equation (19)}$$

where M is the total number of downsampling iterations and $w_i$ is the weight given to each downsampling iteration i.

In some embodiments, at least one of the weights $w_i$ is non-zero. Stated somewhat differently, PSNR differences at one or more iterations i can be given a weight of zero to effectively ignore that PSNR difference, provided that not all of the weights are ignored.

Figure 10:
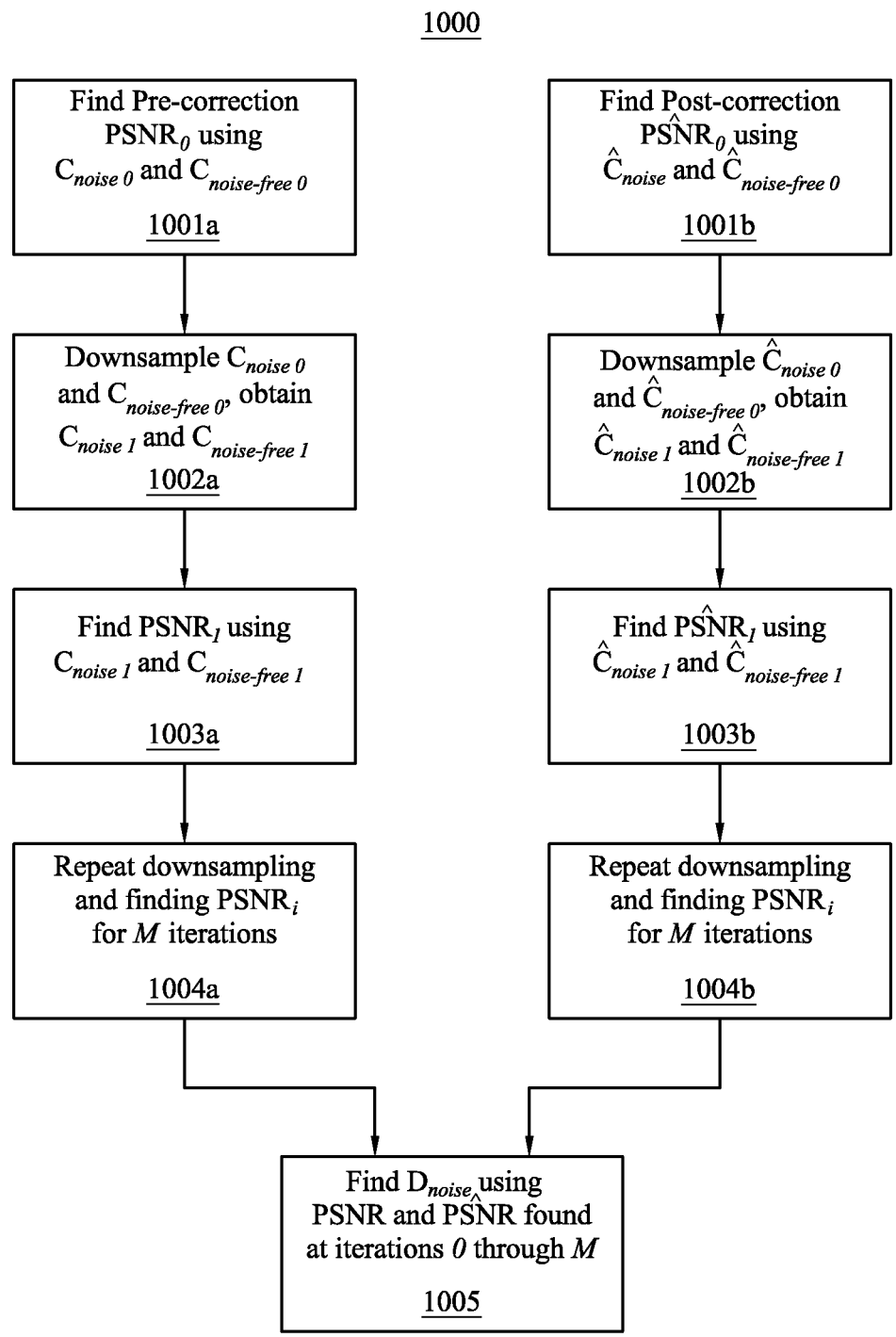
FIG. 10 is an exemplary flow chart illustrating an embodiment of the method of FIG. 5, wherein the method includes sampling at different spatial frequencies to determine a noise amplification metric.

Turning now to FIG. 10, an exemplary method 1000 is shown for finding the noise amplification metric $D_{noise}$ that locates and compares peak signal-to-noise ratios (PSNR) at successively downsampled frequencies. At 1001a, an initial value of a pre-correction PSNR $PSNR_0$ can be found using the pre-correction noise evaluation color values $C_{noise_0}$ and pre-correction noise-free color values $C_{noise\_free_0}$, as described above with reference to FIGS. 8 and 9. At 1002a, $C_{noise_0}$ and $C_{noise\_free_0}$ can each be downsampled to obtain $C_{noise_1}$ and $C_{noise\_free_1}$, respectively. At 1003a, a downsampled $PSNR_1$ can be found from $C_{noise_1}$ and $C_{noise\_free_1}$. Optionally, at 1004a, the process of downsampling and finding a corresponding downsampled PSNR can be repeated forM iterations, as desired.

Similarly, the iterative downsampling process can be repeated for color-corrected images. At 1001b, an initial value of a post-correction PSNR $\widehat{PSNR}_0$ can be found using the post-correction noise evaluation color values $\hat{C}_{noise_0}$ and post-correction noise-free color values $\hat{C}_{noise\_free_0}$, as described above with reference to FIGS. 8 and 9. At 1002b, $\hat{C}_{noise_0}$ and $\hat{C}_{noise\_free_0}$ can each be downsampled to obtain $\hat{C}_{noise_1}$ and $\hat{C}_{noise\_free_1}$, respectively. At 1003b, a downsampled $\widehat{PSNR}_1$ can be found from $\hat{C}_{noise_1}$ and $\hat{C}_{noise\_free_1}$. Optionally, at 1004b, the process of downsampling and finding a corresponding downsampled $\widehat{PSNR}$ can be repeated for M iterations, as desired.

Finally, at 1005, the set of PSNR values and color-corrected PSNR values found at iterations 0 to M can be used to find the noise amplification metric $D_{noise}$—for example, as shown above in Equation (19).

In another embodiment, the noise amplification metric $D_{noise}$ can be obtained based on a variance of Y, U, and V components of the pre-correction noise evaluation color values $C_{noise_0}$ and post-correction noise evaluation color values $\hat{C}_{noise_0}$. In an exemplary embodiment, the noise amplification metric $D_{noise}$ can be obtained using the Equation (20):

$$D_{noisy} = \frac{\sum_{i=0}^{M} w_i \left( \frac{Var_{noisy_{Y_i}}}{Var_{noise\_input_{Y_i}}} + \frac{Var_{noisy_{U_i}}}{Var_{noise\_input_{U_i}}} + \frac{Var_{noisy_{V_i}}}{Var_{noise\_input_{U_i}}} \right)}{\sum_{i=0}^{M} w_i}$$

wherein $$Var_{noise\_input_{Y_i}}$$

represents the variance of the Y components of the pre-correction noise evaluation color values $C_{noise_i}$; and $$Var_{noisy_{Y_i}}$$

represents the variance of the Y components of the post-correction noise evaluation color values $\hat{C}_{noise_i}$; and likewise for the U and V components, and $w_i$ is the weight given to each downsampling iteration i, where $w_i \geq 0$.

Figure 11:
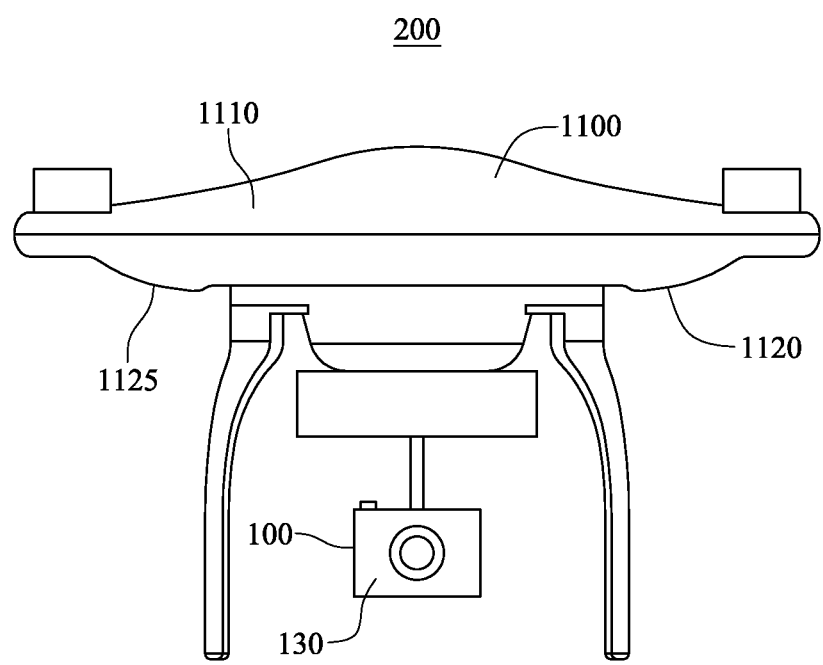
FIG. 11 is an exemplary diagram illustrating an embodiment of an imaging system installed on an unmanned aerial vehicle (UAV).

Turning now to FIG. 11, an exemplary embodiment of the imaging system 200 is shown wherein the imaging system 200 is shown as being installed aboard an unmanned aerial vehicle (UAV) 1100. A UAV 1100, colloquially referred to as a "drone," is an aircraft without an onboard human pilot and whose flight is controlled autonomously and/or by a remote pilot. The imaging system 200 is suitable for installation aboard any of various types of UAVs 1100, including, but not limited to, rotocraft, fixed-wing aircraft, and hybrids thereof. Suitable rotocraft include, for example, single rotor, dual rotor, trirotor, quadrotor (quadcopter), hexarotor, and octorotor rotocraft. The imaging system 200 can be installed on various portions of the UAV 1100. For example, the imaging system 200 can be installed within a fuselage 1110 of the UAV 1100. Alternatively, the imaging system 200 can be mounted onto an exterior surface 1020 (for example, on the underside 1025) of the UAV 1100. Furthermore, the various components of the imaging system 200 can be installed on the same portion, and/or different portions, of the UAV 1100. For example, an image sensor 130 can be mounted on an exterior surface 1120 to facilitate image acquisition; while, a color correction apparatus 100 advantageously can be installed within the fuselage 1110 for protection against wear and tear. Likewise, the various components of the color correction apparatus 100 can be installed on the same portion, and/or different portions, of the UAV 1100. Although shown and described with respect to a UAV 1100 for purposes of illustration only, the imaging system 200 can include, or be mounted on, any type of mobile platform. Exemplary suitable mobile platforms include, but are not limited to, bicycles, automobiles, trucks, ships, boats, trains, helicopters, aircraft, various hybrids thereof, and the like.

Example 1

Figure 12:
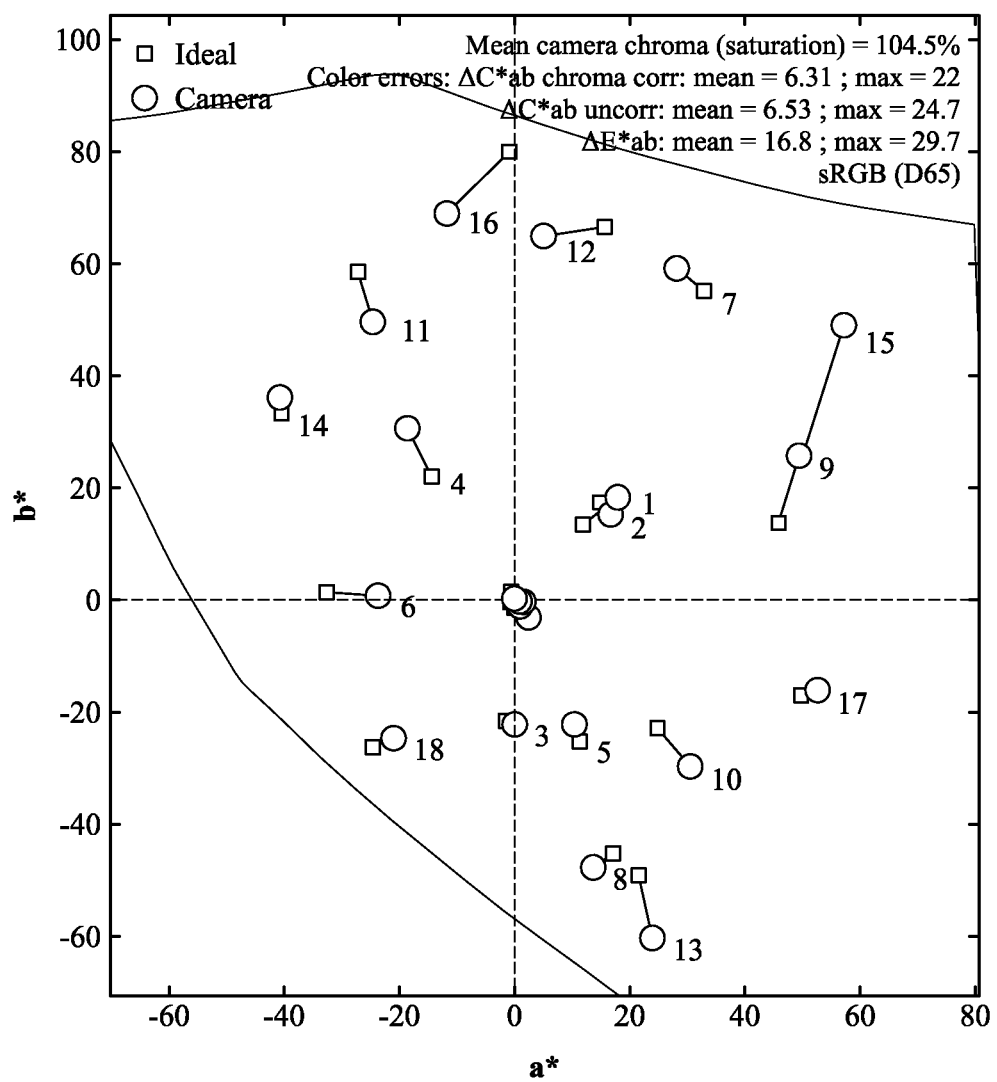
FIG. 12 is an exemplary diagram illustrating a chrominance diagram showing a color error of a first experiment testing the efficacy of optimizing color correction parameters with noise regulation.
Figure 13:
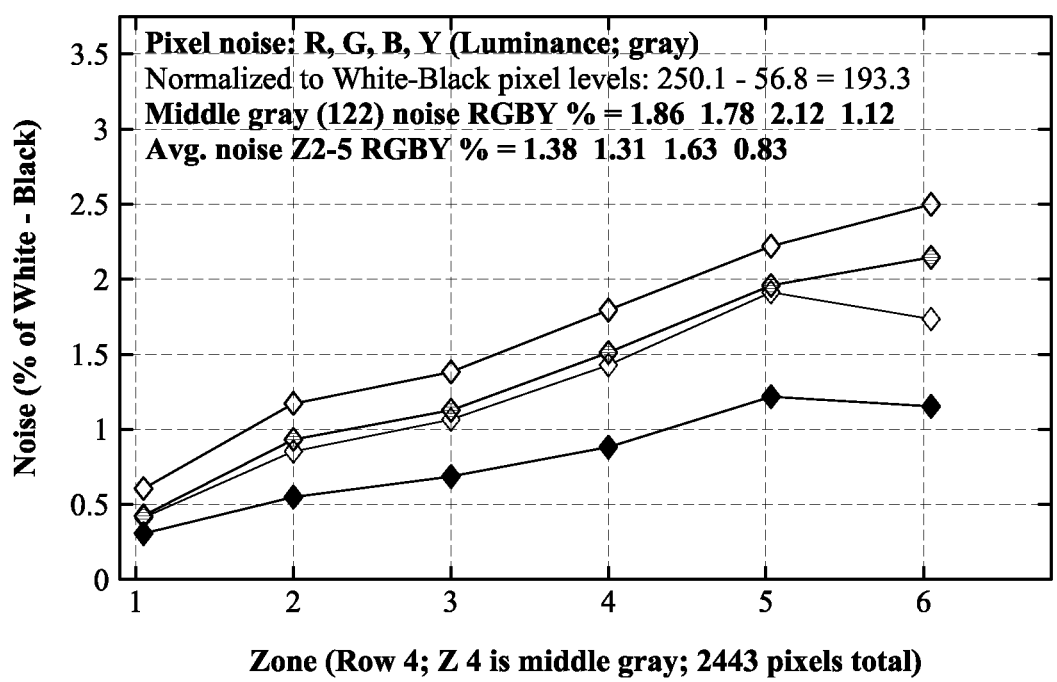
FIG. 13 is an exemplary diagram illustrating noise values of the experiment of FIG. 9 testing the efficacy of optimizing color correction parameters with noise regulation.

The following color correction parameter calibration experiment was performed to determine the efficacy of a method of calibration with noise regulation in comparison to the method without noise regulation. First, an input image was used to calibrate color correction parameters by using a fitness function that includes the noise amplification metric in the manner described above. FIG. 12 shows a chrominance diagram of resulting color errors in a CIE L*a*b* color space (showing a cross section in the a* and b* dimensions), showing a mean color correction error of 16.8 with a maximum color correction error of 29.7. FIG. 13 shows a plot of the resulting noise levels from the same experiment, showing that the average Y (luminance) noise is 0.83%; while, the average chrominance noise in the R, G, and B components are 1.38%, 1.31%, and 1.63%, respectively.

Figure 14:
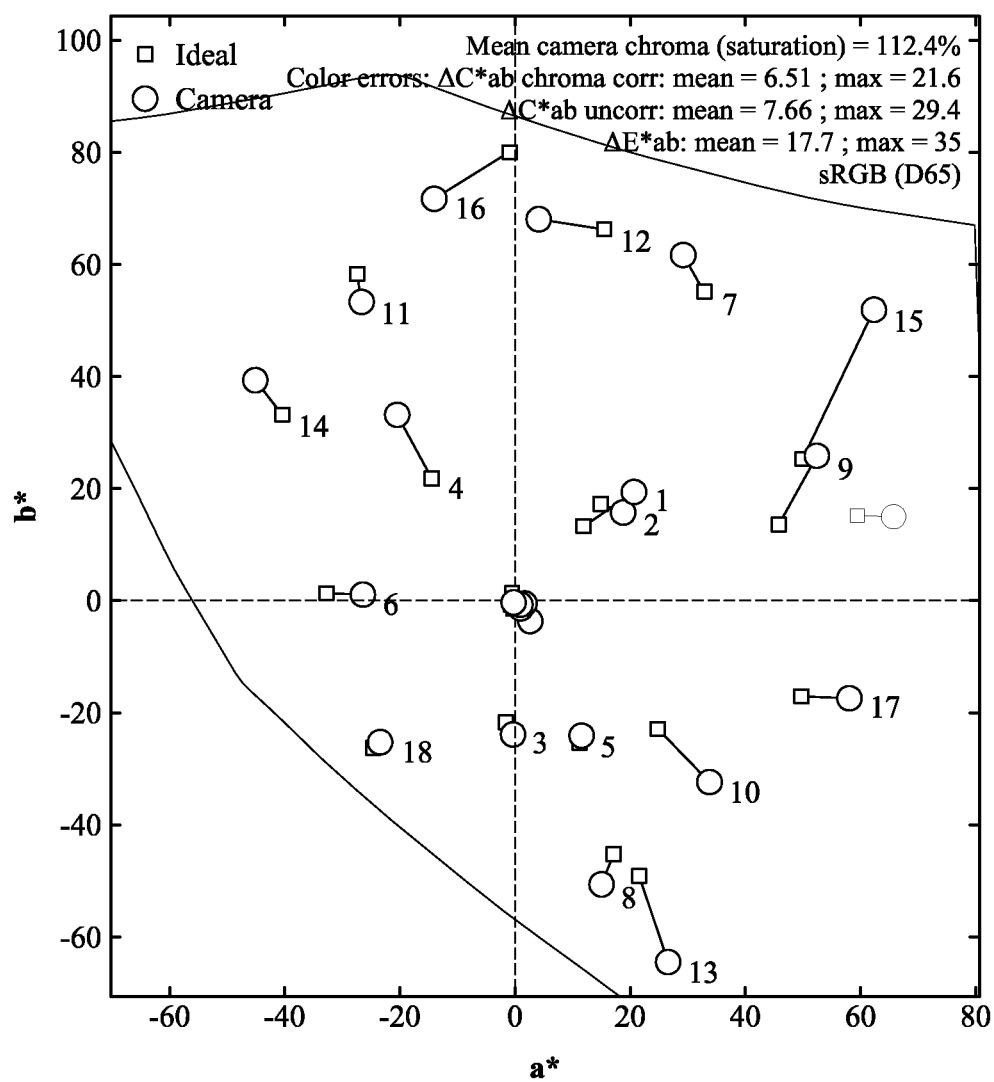
FIG. 14 is an exemplary diagram illustrating a chrominance diagram showing a color error of a second experiment testing the efficacy of optimizing color correction parameters without noise regulation.
Figure 15:
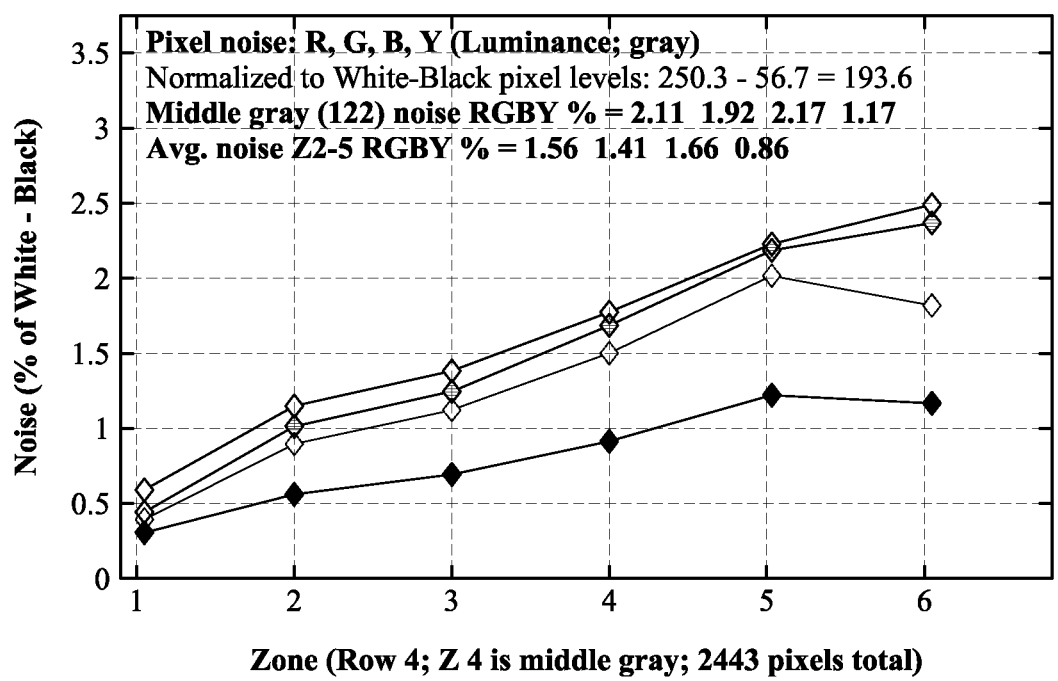
FIG. 15 is an exemplary diagram illustrating noise values of the experiment of FIG. 11 testing the efficacy of optimizing color correction parameters without noise regulation.

In contrast, the same input image was used to calibrate color correction parameters by using a fitness function that does not include the noise amplification metric. FIG. 14 shows a chrominance diagram of resulting color errors in a CIE L*a*b* color space, showing a mean color correction error of 17.7 with a maximum color correction error of 35, both of which are significantly greater than the corresponding errors obtained with noise regulation. FIG. 15 shows a plot of the corresponding noise levels of the experiment, showing that the average Y (luminance) noise is 0.86%; while, the average chrominance noise in the R, G, and B components are 1.56%, 1.31%, and 1.66%, respectively, which are significantly greater than the noise obtained by calibration with noise regulation. Accordingly, it can be seen from this experiment that color correction parameter calibration with noise regulation is an improvement over color correction parameter calibration without noise regulation.

Example 2

The following color correction parameter calibration experiment was performed to determine the efficacy of a method of calibration with conversion to a CIE L*a*b* color space in comparison to the method that performs the calibration in a CIE XYZ color space. First, an input image was used to calibrate color correction parameters after the input and reference colors of the input image are converted to a CIE L*a*b*. Optimization yielded the following matrix of color correction parameters:

$$M_1 = \begin{bmatrix} 0.47009134530394125 & 0.30369624777814247 & 0.226212406917916 \\ 0.1126102415 & 0.5888365492340442 & 0.29855320919654277 \\ 0.07360346735208151 & -0.258973359 & 1.1853698917599211 \end{bmatrix}$$

having an optimized $e_c$ of 2.412169304.

Next, the same input image was used to calibrate color correction parameters after the input and reference colors of the input image are converted to a CIE XYZ. Optimization yielded the following matrix of color correction parameters:

$$M_2 = \begin{bmatrix} 1.11570755070485 & 0.160204597011795 & 0.044497 \\ -0.473878528884461 & 1.60653254387421 & -0.132654014989749 \\ -0.0543893885667206 & -0.8115292 & 1.86591858820061 \end{bmatrix}$$

having an optimized $e_c$ of 3.0107447. This comparison shows that using a non-linear color space—here, a CIE L*a*b* color space—yields improved results over using a CIE XYZ color space.

Example 3

Figure 16:
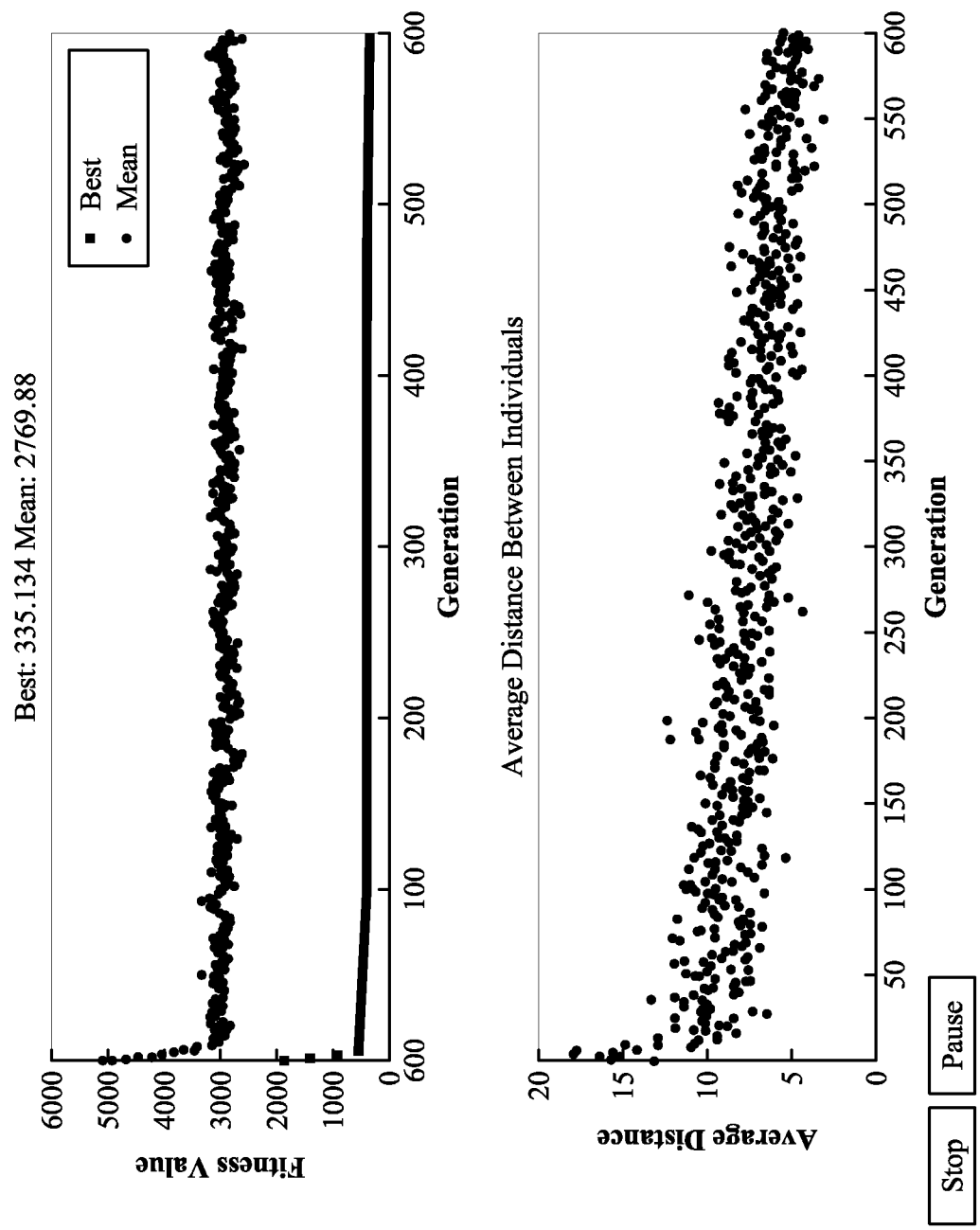
FIG. 16 is an exemplary diagram illustrating a two-step method for optimizing color correction parameters with noise regulation.

The following example shows the process of optimizing a set of color correction parameters using the two-step method of FIG. 6. In the first step of the two-step method, a genetic process is used to find a set of initial parameters so as to avoid becoming trapped in local optima. The fitness value of the parameters for the genetic process over six hundred generations is shown in FIG. 16 at the upper panel, showing that the fitness value reaches a best value of 335.134 after 600 generations. In the second step of the two-step method, a direct optimization process is used starting from the initial parameters produced at the end of step one. In the second step, after another 600 generations, the direct optimization method reduces the average distance between the corrected input colors and the corresponding reference colors, as shown in FIG. 15 at the lower panel. This example shows that it is advantageous to use a two-step optimization method.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

What is claimed is:

1. A computer-implemented method for color correction, comprising:
   obtaining a noise evaluation image by adding noise to a noise-free image;
   color correcting the noise evaluation image using a plurality of color correction parameters;
   color correcting the noise-free image using the plurality of color correction parameters;
   determining a noise amplification metric at least by comparing the corrected noise evaluation image with the corrected noise-free image; and
   adjusting the plurality of color correction parameters based on the noise amplification metric.

2. The method of claim 1, wherein said determining the noise amplification metric comprises determining the noise amplification metric using at least one peak signal-to-noise ratio (PSNR).

3. The method of claim 2, wherein determining the noise amplification metric comprises determining a PSNR for the noise evaluation image by comparing the noise evaluation image with the noise-free image, and determining a PSNR for the corrected noise evaluation image by comparing the corrected noise evaluation image with the corrected noise-free image.

4. The method of claim 3, wherein determining the noise amplification metric further comprises determining a PSNR difference that is a difference between the PSNR for the noise evaluation image and the PSNR for the corrected noise evaluation image.

5. The method of claim 4, wherein determining the noise amplification metric comprises determining a downsampled PSNR difference by:
   downsampling the noise evaluation image and the noise-free image to obtain a downsampled noise evaluation image and a downsampled noise-free image;
   downsampling the corrected noise evaluation image and the corrected noise-free image to obtain a downsampled corrected noise evaluation image and a downsampled corrected noise-free image; and
   finding the downsampled PSNR difference as a difference between a PSNR for the downsampled noise evaluation image and a PSNR for the downsampled corrected noise evaluation image.

6. The method of claim 1, wherein said obtaining the noise evaluation image comprises obtaining a virtual noise evaluation image.

7. The method of claim 1, wherein said adjusting comprises determining a fitness function using the noise amplification metric and a color correction error.

8. The method of claim 7, wherein the color correction error is determined by:
   color correcting input color values; and
   comparing the corrected input color values with respective reference color values.

9. A system, comprising:
   a memory that stores one or more computer-executable instructions; and
   one or more processors configured to access the memory and execute the computer-executable instructions to perform a method comprising:
      obtaining a noise evaluation image by adding noise to a noise-free image;
      color correcting the noise evaluation image using a plurality of color correction parameters;

color correcting the noise-free image using the plurality of color correction parameters;

determining a noise amplification metric at least by comparing the corrected noise evaluation image with the corrected noise-free image; and adjusting the plurality of color correction parameters based on the noise amplification metric.

10. The system of claim 9, wherein said determining the noise amplification metric comprises determining the noise amplification metric using at least one peak signal-to-noise ratio (PSNR).

11. The system of claim 10, wherein determining the noise amplification metric comprises determining a PSNR for the noise evaluation image by comparing the noise evaluation image with the noise-free image, and determining a PSNR for the corrected noise evaluation image by comparing the corrected noise evaluation image with the corrected noise-free image.

12. The system of claim 11, wherein determining the noise amplification metric further comprises determining a PSNR difference that is a difference between the PSNR for the noise evaluation image and the PSNR for the corrected noise evaluation image.

13. The system of claim 12, wherein determining the noise amplification metric comprises determining a downsampled PSNR difference by:

downsampling the noise evaluation image and the noise-free image to obtain a downsampled noise evaluation image and a downsampled noise-free image;

downsampling the corrected noise evaluation image and the corrected noise-free image to obtain a downsampled corrected noise evaluation image and a downsampled corrected noise-free image; and finding the downsampled PSNR difference as a difference between a PSNR for the downsampled noise evaluation image and a PSNR for the downsampled corrected noise evaluation image.

14. The system of claim 9, wherein said obtaining the noise evaluation image comprises obtaining a virtual noise evaluation image.

15. The system of claim 9, wherein said adjusting comprises determining a fitness function using the noise amplification metric and a color correction error.

16. The system of claim 15, wherein the color correction error is determined by:

color correcting input color values; and comparing the corrected input color values with respective reference color values.

17. One or more non-transitory computer-readable storage media storing computer-executable instructions that, when executed by a computing system, configure the computing system to perform a method comprising:

obtaining a noise evaluation image by adding noise to a noise-free image;

color correcting the noise evaluation image using a plurality of color correction parameters;

color correcting the noise-free image using the plurality of color correction parameters;

determining a noise amplification metric at least by comparing the corrected noise evaluation image with the corrected noise-free image; and adjusting the plurality of color correction parameters based on the noise amplification metric.

18. The one or more non-transitory computer-readable storage media of claim 17, wherein said determining the noise amplification metric comprises determining the noise amplification metric using at least one peak signal-to-noise ratio (PSNR).

19. The one or more non-transitory computer-readable storage media of claim 18, wherein determining the noise amplification metric comprises determining a PSNR for the noise evaluation image by comparing the noise evaluation image with the noise-free image, and determining a PSNR for the corrected noise evaluation image by comparing the corrected noise evaluation image with the corrected noise-free image.

20. The one or more non-transitory computer-readable storage media of claim 19, wherein determining the noise amplification metric further comprises determining a PSNR difference that is a difference between the PSNR for the noise evaluation image and the PSNR for the corrected noise evaluation image.

\* \* \* \* \*